United States Patent
Min et al.

(10) Patent No.: US 10,678,093 B2
(45) Date of Patent: Jun. 9, 2020

(54) BACKLIGHT UNIT COMPRISING A CHOLESTERIC LIQUID CRYSTAL LAYER AND A POLARIZING PORTION HAVING A WAVEPLATE AND A POLARIZING FILM AND DISPLAY APPARATUS INCLUDING THE SAME

(71) Applicant: SAMSUNG ELECTRONICS CO., LTD., Suwon-si (KR)

(72) Inventors: Kwan Sik Min, Gunpo-si (KR); Ki Hyung Kang, Suwon-si (KR); Seung Jun Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 15/713,960

(22) Filed: Sep. 25, 2017

(65) Prior Publication Data

US 2018/0136518 A1 May 17, 2018

(30) Foreign Application Priority Data

Nov. 14, 2016 (KR) .......................... 10-2016-0151239

(51) Int. Cl.
*G02F 1/1335* (2006.01)
*G02F 1/137* (2006.01)
(Continued)

(52) U.S. Cl.
CPC ........... *G02F 1/13362* (2013.01); *G02B 5/30* (2013.01); *G02B 5/3025* (2013.01);
(Continued)

(58) Field of Classification Search
CPC ..... G02F 1/13718; G02F 2001/133543; G02F 2201/343; G02F 2001/133541;
(Continued)

(56) References Cited

U.S. PATENT DOCUMENTS

2006/0077547 A1\* 4/2006 Choi .................... G02B 5/0242
359/487.02
2007/0263139 A1\* 11/2007 Hwang ................ G02B 6/0056
349/96
(Continued)

FOREIGN PATENT DOCUMENTS

KR  10-2008-0057883 A   6/2008
KR  10-2011-0138585 A   12/2011
(Continued)

OTHER PUBLICATIONS

International Search Report (PCT/ISA/210) dated Feb. 20, 2018 issued by the International Searching Authority in International Application No. PCT/KR2017/012223.
(Continued)

*Primary Examiner* — Paul C Lee
(74) *Attorney, Agent, or Firm* — Sughrue Mion, PLLC

(57) ABSTRACT

A backlight unit capable of implementing matrix local dimming using cholesteric liquid crystal and a polarizing portion, and a display apparatus including the backlight unit are provided. A display apparatus may include: a backlight unit; and an image forming unit configured to create an image by performing at least one from among transmitting and blocking light emitted from the backlight unit. The backlight unit may include: a waveguide plate; a cholesteric liquid crystal layer disposed in front of the waveguide plate, and configured to perform at least one from among transmitting and circularly polarizing the light emitted from the waveguide plate, to generate at least one from among transmitted light and circularly polarized light; and a polarizing portion disposed in front of the cholesteric liquid crystal layer, and configured to transmit the transmitted light in a front direction, and to block the circularly polarized light.

16 Claims, 15 Drawing Sheets

(51) Int. Cl.
  *G02B 5/30* (2006.01)
  *F21V 8/00* (2006.01)
  *G02B 27/28* (2006.01)
  *G02F 1/13357* (2006.01)

(52) U.S. Cl.
  CPC ........... *G02B 6/0056* (2013.01); *G02B 27/28* (2013.01); *G02F 1/13718* (2013.01); *G02F 1/133524* (2013.01); *G02F 1/133528* (2013.01); *G02F 2001/133541* (2013.01); *G02F 2001/133543* (2013.01); *G02F 2201/343* (2013.01); *G09G 2300/0486* (2013.01)

(58) Field of Classification Search
  CPC ... G02F 2001/133601; G02F 1/133524; G02F 1/1347; G09G 2300/0486; G02B 27/28; G02B 6/0056
  See application file for complete search history.

(56) References Cited

U.S. PATENT DOCUMENTS

| | | | |
|---|---|---|---|
| 2009/0251625 A1 | 10/2009 | Kwon et al. | |
| 2011/0141406 A1* | 6/2011 | Lin | G02F 1/133636 349/75 |
| 2011/0248936 A1* | 10/2011 | Kim | G06F 3/0412 345/173 |
| 2012/0230008 A1* | 9/2012 | Ajichi | G02B 6/0056 362/19 |

FOREIGN PATENT DOCUMENTS

| | | | | |
|---|---|---|---|---|
| KR | 10-2012-0028364 A | 3/2012 | | |
| KR | 10-2012-0077608 A | 7/2012 | | |
| KR | 101305365 B1 * | 9/2013 | ............. | G02F 1/337 |
| KR | 10-1414641 B1 | 7/2014 | | |
| KR | 10-1477425 B1 | 12/2014 | | |
| KR | 10-2016-0032225 A | 3/2016 | | |
| KR | 10-2016-0116792 A | 10/2016 | | |
| WO | WO-2011162483 A2 * | 12/2011 | ........... | G02F 1/1334 |
| WO | 2016002343 A1 | 1/2016 | | |

OTHER PUBLICATIONS

Communication dated Jul. 22, 2019, issued by the European Patent Office in counterpart European Application No. 17868841.2.
Communication dated Feb. 26, 2020, issued by the European Patent Office in counterpart European Application No. 17 868 841.2.

* cited by examiner

BACKLIGHT UNIT COMPRISING A CHOLESTERIC LIQUID CRYSTAL LAYER AND A POLARIZING PORTION HAVING A WAVEPLATE AND A POLARIZING FILM AND DISPLAY APPARATUS INCLUDING THE SAME

CROSS-REFERENCE TO RELATED APPLICATION

This application claims the benefit of Korean Patent Application No. 10-2016-0151239, filed on Nov. 14, 2016 in the Korean Intellectual Property Office, the disclosure of which is incorporated herein by reference.

BACKGROUND

1. Field

Apparatuses consistent with example embodiments relate to a display apparatus, and more particularly, to a backlight unit capable of implementing matrix local dimming.

2. Description of the Related Art

A display apparatus is a kind of output apparatus that converts acquired or stored electrical information into visual information to display the visual information for users. The display apparatus is widely used in various environments, such as home or places of business.

The display apparatus includes a monitor connected to a personal computer (PC) or a server, a portable computer device, a navigation system, a television, an Internet Protocol television (IPTV), a portable terminal (e.g., a smart phone, a tablet PC, a personal digital assistant (PDA), a cellular phone), various kinds of displays used to reproduce advertisements or movies at commercial establishments, and various kinds of audio/video systems.

The display apparatus can display still images or moving images using various kinds of display means. The display means includes cathode ray tube (CRT), a light-emitting diode (LED), an organic light-emitting diode (OLED), an active-matrix organic light-emitting diode (AMOLED), a liquid crystal, or electronic paper.

SUMMARY

One or more example embodiments provide a backlight unit capable of implementing matrix local dimming using cholesteric liquid crystal and a polarizing portion, and a display apparatus including the backlight unit.

Additional aspects of the disclosure will be set forth in part in the description which follows and, in part, will be obvious from the description, or may be learned by practice of the disclosure.

According to an aspect of an example embodiment, a display apparatus may include: a backlight unit; and an image forming unit configured to create an image by performing at least one of transmitting and blocking light emitted from the backlight unit. The backlight unit may include: a waveguide plate; a cholesteric liquid crystal layer disposed in front of the waveguide plate, and configured to perform at least one of transmitting and circularly polarizing the light emitted from the waveguide plate, to generate at least one of transmitted light and circularly polarized light; and a polarizing portion disposed in front of the cholesteric liquid crystal layer, and configured to transmit the transmitted light in a front direction, and to block the circularly polarized light.

The polarizing portion may include: a waveplate disposed in front of the cholesteric liquid crystal layer, and configured to linearly polarize the circularly polarized light to generate linearly polarized light, and to transmit the transmitted light in the front direction; and a polarizing film disposed in front of the waveplate, and configured to block the linearly polarized light, and to linearly polarize the transmitted light.

The polarizing film may be further configured to polarize incident light in a first direction of a first polarizing axis that is different from a second direction of a second polarizing axis of the linearly polarized light that is linearly polarized by the waveplate.

The waveplate may be a quarter-wave plate.

The backlight unit may apply no voltage to a first part of the cholesteric liquid crystal layer so that the first part of the cholesteric liquid crystal layer transits to a planar state, and apply a voltage to a second part of the cholesteric liquid crystal layer so that the second part of the cholesteric liquid crystal layer transits to one of a homeotropic state and a focal conic state.

The cholesteric liquid crystal layer may include: cholesteric liquid crystal; a front electrode disposed in front of the cholesteric liquid crystal; and a rear electrode disposed behind the cholesteric liquid crystal, and arranged to be orthogonal to the front electrode.

The backlight unit may include a light source disposed on one side of the waveguide plate, and configured to emit the light toward the waveguide plate.

The backlight unit may include a quantum dot sheet disposed in front of the polarizing portion.

According to an aspect of an example embodiment, a backlight unit may include: a waveguide plate; a light source disposed on one side of the waveguide plate, and configured to emit light toward the waveguide plate; a cholesteric liquid crystal layer disposed in front of the waveguide plate, and configured to perform at least one of transmitting and circularly polarizing the light emitted from the waveguide plate to generate at least one of transmitted light and circularly polarized light; and a polarizing portion disposed in front of the cholesteric liquid crystal layer, and configured to emit the transmitted light in a front direction, and to block the circularly polarized light.

The polarizing portion may include: a waveplate disposed in front of the cholesteric liquid crystal layer, and configured to linearly polarize the circularly polarized light to generate linearly polarized light, and to transmit the transmitted light in the front direction; and a polarizing film disposed in front of the waveplate, and configured to block the linearly polarized light, and to linearly polarize the transmitted light.

The polarizing film may be further configured to polarize incident light in a first direction of a first polarizing axis that is different from a second direction of a second polarizing axis of the linearly polarized light that is linearly polarized by the waveplate.

The waveplate may be a quarter-wave plate.

The cholesteric liquid crystal layer applies no voltage to a first part of the cholesteric liquid crystal layer so that the first part of the cholesteric liquid crystal layer transits to a planar state, and apply a voltage to a second part of the cholesteric liquid crystal layer so that the second part of the cholesteric liquid crystal layer transits to one of a homeotropic state and a focal conic state.

The cholesteric liquid crystal layer may include: cholesteric liquid crystal; a front electrode disposed in front of the cholesteric liquid crystal; and a rear electrode disposed behind the cholesteric liquid crystal, and arranged to be orthogonal to the front electrode.

According to an aspect of an example embodiment, a display apparatus may include: a backlight unit; and an image forming unit configured to create an image by performing at least one of transmitting and blocking light emitted from the backlight unit. The backlight unit may include: a waveguide plate; a cholesteric liquid crystal layer disposed in front of the waveguide plate, and configured to perform at least one of transmitting and circularly polarizing the light emitted from the waveguide plate, to generate at least one of transmitted light and circularly polarized light; a waveplate disposed in front of the cholesteric liquid crystal layer, and configured to linearly polarize the circularly polarized light to generate linearly polarized light, and to transmit the transmitted light in a front direction; and a polarizing film disposed in front of the waveplate, and configured to block the linearly polarized light, and to linearly polarize the transmitted light.

The polarizing film may be further configured to polarize incident light in first a direction of a first polarizing axis that is different from a second direction of a second polarizing axis of the linearly polarized light that is linearly polarized by the waveplate.

The waveplate may be a quarter-wave plate.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Figure 1:
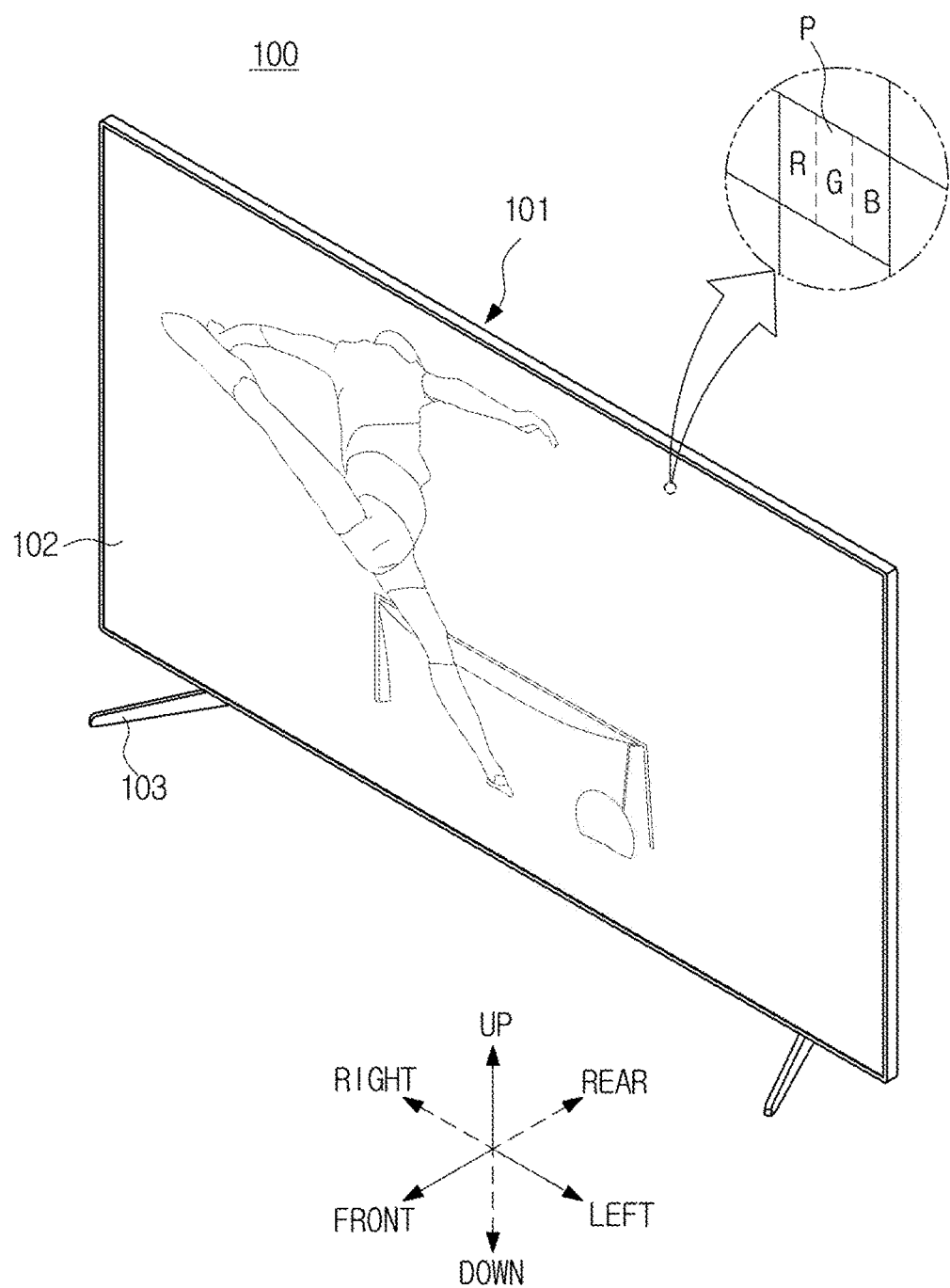
FIG. 1 shows an outer appearance of a display apparatus according to an example embodiment.

Configurations illustrated in the embodiments and the drawings described in the present disclosure are only exemplary, and thus it is to be understood that various modified examples, which may replace or supplement the example embodiments and the drawings described in the present disclosure, are possible.

Also, the terms used in the present disclosure are used for describing the example embodiments, not for the purpose of limiting and/or restricting the present disclosure.

It is to be understood that the singular forms "a," "an," and "the" may include plural referents unless the context clearly dictates otherwise.

Also, it will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms.

As used herein, the terms "unit," "device," "block," "member," or "module" may refer to a unit that can perform at least one function or operation. For example, the terms may means at least one process that is processed by at least one software or processor stored in at least hardware or memory, such as a field programmable gate array (FPGA) or an application-specific integrated circuit (ASIC). The word "exemplary" is used herein to mean "serving as an example or illustration." Any aspect or design described herein as "exemplary" is not necessarily to be construed as preferred or advantageous over other aspects or designs. Moreover, claim language reciting "one of" or "at least one of" a set indicates that one member of the set or multiple members of the set satisfy the claim.

Hereinafter, example embodiments of the present disclosure will be described in detail with reference to the accompanying drawings. Like reference numerals or symbols denoted in the drawings of the present specification represent members or components that perform the substantially same functions.

Some terms used in the present specification are defined as follows. White light represents light obtained by mixing red light, green light, and blue light or by mixing blue light with yellow light. Also, natural light represents light obtained by mixing all wavelengths of light corresponding to a visible light region.

FIG. 1 shows an outer appearance of a display apparatus according to an example embodiment.

Referring to FIG. 1, a display apparatus 100 is equipment for processing image signals received from an external image source to visually display the processed signals as an image. In the example embodiment shown in FIG. 1, the display apparatus 100 is a television. However, the display apparatus 100 is not limited to a TV. For example, the display apparatus 100 may be one of various kinds of displays, such as a monitor, a portable multimedia device, and a portable communication device, which are capable of visually displaying images.

As shown in FIG. 1, the display apparatus 100 may include a main body 101, a screen 102 for displaying an image, and a supporter 103 connected to the lower part of the main body 101 to support the main body 101.

The main body 101 may form an outer appearance of the display device 100, and include components to enable the display device 100 to display images or to perform various functions. The main body 101 may be in the shape of a flat plate as shown in FIG. 1. However, the shape of the main body 101 is not limited to the flat plate. For example, the main body 101 may be in the shape of a curved plate whose left and right edges protrude forward and whose center part is recessed (e.g., concave).

The screen 102 may be formed in the front side of the main body 101, and display images that are visual information. For example, the screen 102 may display a still image, a moving image, a two-dimensional (2D) planar image, or a three-dimensional (3D) stereoscopic image using a user's binocular disparity.

The screen 102 may include a plurality of pixels P, and the plurality of pixels P may emit light to form an image on the screen 102. Light emitted from the plurality of pixels P may be combined to form a still image, like mosaics, on the screen 102.

The individual pixels P may emit light of various brightness levels and various colors. In order to represent various colors, each pixel P may include a red pixel R, a green pixel G, and a blue pixel B. The red pixel R may emit red light of various brightness levels, the green pixel G may emit green light of various brightness levels, and the blue pixel B may emit blue light of various brightness levels. The red light may be light corresponding to a wavelength region of about 620 nm to 750 nm, the green light may be light corresponding to a wavelength region of about 495 nm to 570 nm, and the blue light may be light corresponding to a wavelength region of about 450 nm to 495 nm.

Red light from the red pixel R, green light from the green pixel G, and blue light from the blue pixel B may be combined or blended in the user's eye so that the pixel P can create light of various brightness levels and various colors.

The supporter 103 may connect to the lower portion of the main body 101, and enable the main body 101 to be maintained at a stable position against a bottom surface. Also, optionally, the supporter 103 may connect to the back side of the main body 101, and enable the main body 101 to be firmly attached on a wall.

The supporter 103 shown in FIG. 1 may be in the shape of a bar protruding forward from the lower portion of the main body 101. However, the shape of the supporter 103 is not limited to the bar shape shown in FIG. 1, and may have any shape as long as it can support the main body 101 stably.

Figure 2:
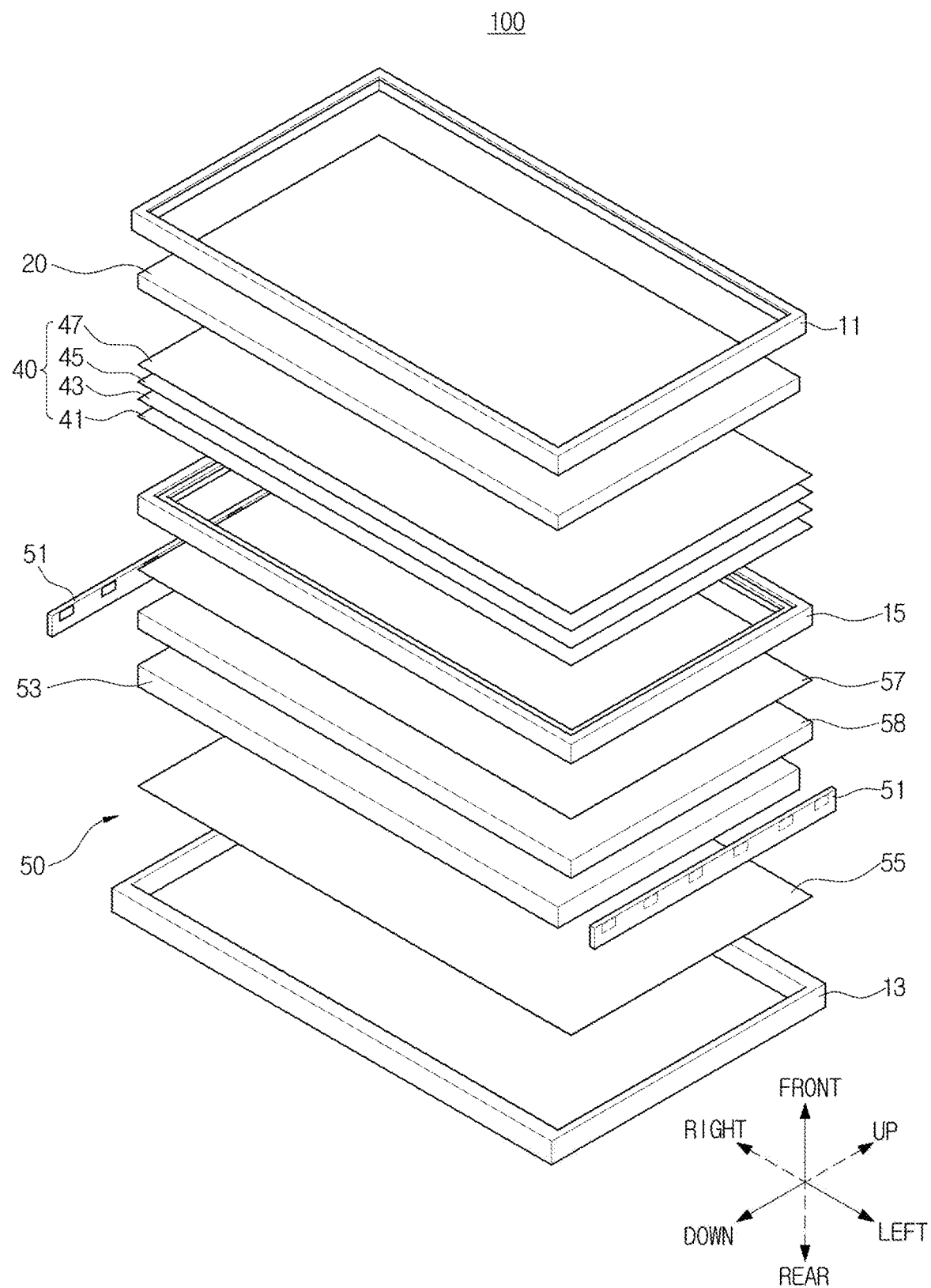
FIG. 2 is an exploded perspective view of the display apparatus according to an example embodiment.
Figure 3:
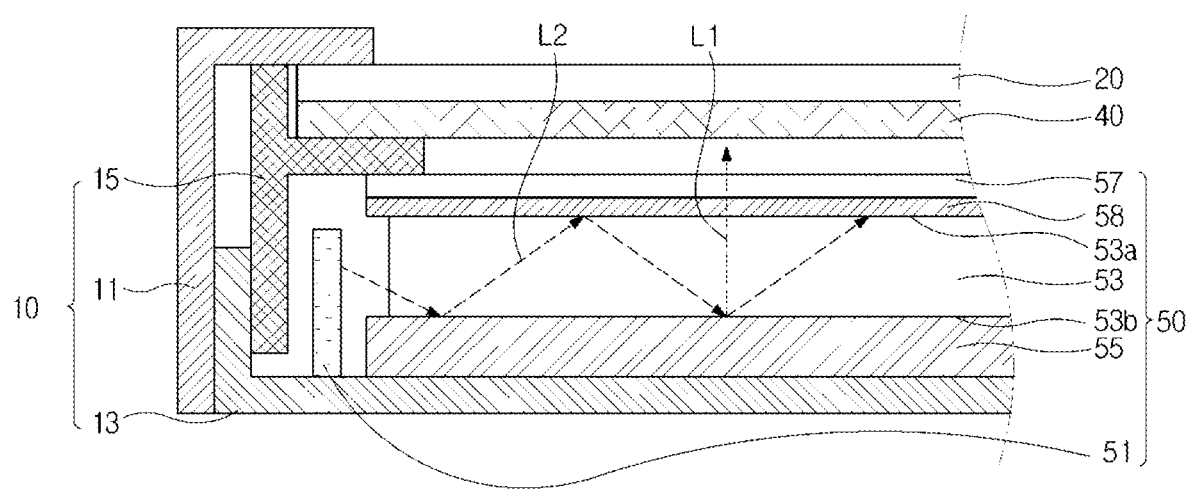
FIG. 3 is a side cross-sectional view of the display apparatus according to an example embodiment.
Figure 4:
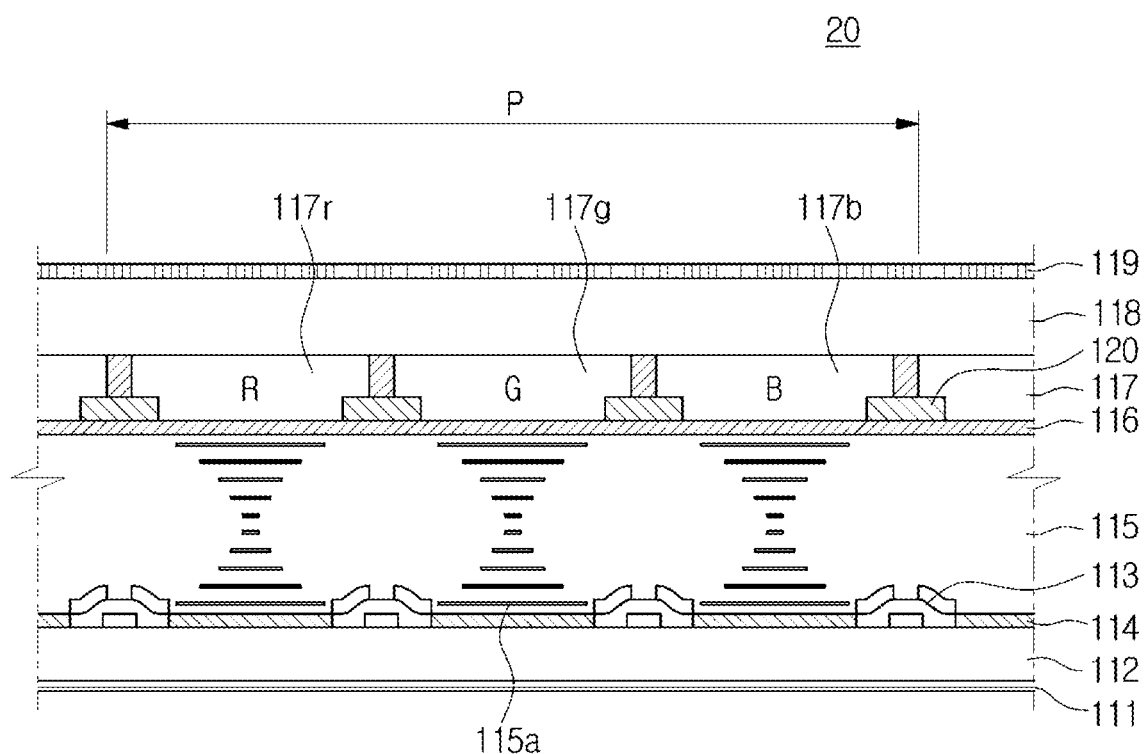
FIG. 4 is a side cross-sectional view of a pixel included in an image forming unit of the display apparatus according to an example embodiment.

FIG. 2 is an exploded perspective view of the display apparatus according to an example embodiment. FIG. 3 is a side cross-sectional view of the display apparatus according to an example embodiment, and FIG. 4 is a side cross-sectional view of a pixel included in an image forming unit of the display apparatus according to an example embodiment.

As shown in FIG. 2, in the main body 101, various components to create an image on the screen 102 may be installed. More specifically, a backlight unit 50 to generate surface light to emit it forward, and an image forming unit 20 to create an image by transmitting or blocking light emitted from the backlight unit 50 may be installed in the main body 101.

Also, a front chassis 11, a rear chassis 13, and a mold frame 15 to fix the image forming unit 20 and the backlight unit 50 may be installed in the main body 101.

The front chassis 11 may be in the shape of a plate having an opening so that a user can see images created by the image forming unit 20 through the opening of the front chassis 11.

The rear chassis 13 may be in the shape of a box with its front portion open, and accommodate the image forming unit 20 and the backlight unit 50 constituting the display device 100. The rear chassis 13 may prevent various components included in the display apparatus 100 from being exposed to the outside, and protect the various components included in the display apparatus 100 from physical impacts. The mold frame 15 may be disposed between the front chassis 11 and the rear chassis 13. More specifically, the mold frame 15 may be disposed between the image forming unit 20 and the backlight unit 50 to fix the image forming unit 20 and the backlight unit 50.

The backlight unit 50 may include a plurality of point light sources to emit monochromatic light or white light, and may refract, reflect, and scatter light in order to convert light emitted from the point light sources into uniform surface light. As such, by refracting, reflecting, and scattering light, the backlight unit 50 can emit uniform surface light forward.

The configuration and operation of the backlight unit 50 will be described in detail, below.

The image forming unit 20 may be disposed in front of the backlight unit 50, and block or transmit light emitted from the backlight unit 50 in order to create an image.

The front surface of the image forming unit 20 may form the screen 102 of the display device 100, and be configured with a plurality of pixels P.

The plurality of pixels P included in the image forming unit 20 may block or transmit light emitted from the backlight unit 50 independently from each other, and light transmitted by the plurality of pixels P may create an image that the display device 100 displays.

The image forming unit 20 may be a liquid crystal panel whose optical properties change according to an electric field.

Hereinafter, a liquid crystal panel will be described as an example of the image forming unit 20.

FIG. 4 is a side cross-sectional view of a pixel included in the image forming unit of the display apparatus according to an example embodiment;

Referring to FIG. 4, the image forming unit 20 may include a first polarizing film 111, a first transparent substrate 112, a plurality of thin-film transistors 113, a plurality of pixel electrodes 114, a liquid crystal layer 115, a common electrode 116, a color filter 117, a second transparent substrate 118, and a second polarizing film 119. The liquid crystal panel according to an example embodiment may include the first transparent substrate 112, the plurality of thin-film transistors 113, the plurality of pixel electrodes 114, the liquid crystal layer 115, the common electrode 116, the color filter 117, and the second transparent substrate 118.

The first transparent substrate 112 and the second transparent substrate 118 may form an outer appearance of the image forming unit 20, and protect the liquid crystal layer 114 and the color filter 117 provided between the first transparent substrate 112 and the second transparent substrate 118. The first and second transparent substrates 112 and 118 may be made of tempered glass or transparent resin.

The first polarizing film 111 and the second polarizing film 119 may be respectively disposed on the outer surface of the first transparent substrate 112 and the outer surface of the second transparent substrate 118.

Light may be composed of a pair of an electric field and a magnetic field vibrating in directions that are orthogonal to the traveling direction of the light. The electric field and the magnetic field may vibrate in all directions that are orthogonal to the traveling direction of the light. A phenomenon in which an electric field or a magnetic field vibrates in a specific direction is called polarization. Also, a film that transmits light including an electric field or a magnetic field vibrating in a specific direction and blocks light including an electric field or a magnetic field vibrating in other directions is called a polarizing film. In other words, a polarizing film may transmit light vibrating in a specific direction, and block light vibrating in other directions.

The first polarizing film 111 may transmit light vibrating in a first direction, and block light vibrating in directions other than the first direction. Also, the second polarizing film 119 may transmit light having an electric field and a magnetic field vibrating in a second direction, and block light vibrating in directions other than the second direction. Herein, the first direction may be orthogonal to the second direction. In other words, a polarizing direction of light transmitted through the first polarizing film 111 may be orthogonal to a vibration direction of light transmitted through the second polarizing film 119. As a result, light cannot be transmitted through both the first polarizing film 111 and the second polarizing film 119 at the same time.

The color filter 117 may be formed on the inner surface of the second transparent substrate 118.

The color filter 117 may include a red filter 117r to transmit red light, a green filter 117g to transmit green light, and a blue filter 117b to transmit blue light, wherein the red filter 117r, the green filter 117g, and the blue filter 117b may be arranged side by side. The color filter 117 may include a black matrix 120 to prevent color interference between the red filter 117r, the green filter 117g, and the blue filter 117b, and to block light from the backlight unit 50 so that the light does not leak to components than the red filter 117r, the green filter 117g, and the blue filter 117b. The black matrix 120 may be positioned between the red filter 117r, the green filter 117g, and the blue filter 117b.

The color filter 117 may be formed to correspond to each pixel P. More specifically, the red filter 117r may be formed to correspond to the red sub-pixel R, the green filter 117g may be formed to correspond to the green sub-pixel G, and the blue filter 117b may be formed to correspond to the blue sub-pixel B. In other words, the red sub-pixel R, the green sub-pixel G, and the blue sub-pixel B may be formed by the red filter 117r, the green filter 117g, and the blue filter 117b, and the red filter 117r, the green filter 117g, and the blue filter 117b may be combined to form the pixel P.

The thin-film transistors 113 may be formed on the inner surface of the first transparent substrate 112.

More specifically, the thin film transistors 113 may be respectively formed to correspond to areas between the red filter 117a and the green filter 117g and between the green filter 117g and the blue filter 117b. In other words, the thin-film transistors 113 may be positioned between the red sub-pixel R, the green sub-pixel G, and the blue sub-pixel B.

The thin film transistors 113 may transmit or block current flowing through the pixel electrodes 114, which will be described later. More specifically, an electric field may be applied or removed between the pixel electrodes 114 and the common electrode 116, according to turning-on (closing) or turning-off (opening) of the thin-film transistors 113. The thin-film transistors 113 may be made of poly-silicon, and may be fabricated using a semiconductor manufacturing process, such as lithography, deposition, and ion implantation.

The pixel electrodes 114 may be formed between the thin-film transistors 113 on the first transparent substrate 112, and the common electrode 116 may be formed on the inner surface of the color filter 117 of the second transparent substrate 118.

The pixel electrodes 114 and the common electrode 116 may be made of a metal material having electrical conductivity, and may form an electric field to change alignment of liquid crystal molecules 115a constituting the liquid crystal layer 115, which will be described later.

The pixel electrodes 114 may be respectively formed at areas corresponding to the red filter 117r, the green filter 117g, and the blue filter 117b, and the common electrode 116 may be formed throughout the panel. As a result, an electric field may be selectively formed at the areas corresponding to the red filter 117r, the green filter 117g, and the blue filter 117b in the liquid crystal layer 115.

Also, the pixel electrodes 114 and the common electrode 116 may be made of a transparent material to transmit light incident from the outside. The pixel electrodes 114 and the common electrode 116 may be formed with indium tin oxide (ITO), indium zinc oxide (IZO), silver nanowire, carbon nanotube (CNT), graphene, or 3,4-ethylenedioxythiophene (PEDOT).

The liquid crystal layer 115 may be formed between the pixel electrodes 114 and the common electrode 116, and may be filled with the liquid crystal molecules 115a.

Liquid crystal is an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. The term "liquid crystal" represents a liquid crystal state which is an intermediate state between a solid state and a liquid state, or represents a material in a liquid crystal state.

Most liquid crystal materials are organic compounds. A molecule of a liquid crystal material is in the shape of a thin, long rod. Also, the molecular arrangement of the liquid crystal material is irregular when observed from a specific direction, but appears as a regular crystalloid pattern when observed from another direction. Accordingly, the liquid crystal has both the fluidity of a liquid and the optical anisotropy of a solid.

Also, the liquid crystal shows optical properties according to a change of an electric field. For example, the liquid crystal may change the orientation of the molecular arrangement according to a change of an electric field. For example, if an electric field is applied to the liquid crystal layer 115, the liquid crystal molecules 115a of the liquid crystal layer 115 may be arranged in the direction of the electric field, and if no electric field is applied in the liquid crystal layer 115, the liquid crystal molecules 115a may be arranged irregularly or according to an orientation layer.

As a result, the image forming unit (that is, a liquid crystal panel) 20 may change its optical properties according to presence/absence of an electric field in the liquid crystal layer 115.

For example, when no electric field is applied to the liquid crystal layer 115, light polarized by the first polarizing film 111 can pass through the second polarizing film 119 due to the arrangement of the liquid crystal molecules 115a in the liquid crystal layer 115. In other words, at a pixel P corresponding to an area of the liquid crystal layer 115 to which no electric field is applied, light is transmitted by the image forming unit 110.

Meanwhile, when an electric field is applied to the liquid crystal layer 115, light polarized by the first polarizing film 111 cannot pass through the liquid crystal layer 115 due to the arrangement of the liquid crystal molecules 115a in the liquid crystal layer 115. In other words, at a pixel P corresponding to an area of the liquid crystal layer 115 to which an electric field is applied, light is blocked by the image forming unit 110.

As described above, the image forming unit 110 may control a light permeability ratio for each pixel P (more specifically, for each of a red sub-pixel, a green sub-pixel, and a blue sub-pixel included in each pixel P). As a result, light emitted from the plurality of pixels P may be combined to display an image on the screen 102 of the display device 100.

Hereinafter, the backlight unit 50 will be described.

The backlight unit 50 may be classified as a direct type backlight unit or an edge type backlight unit according to the positions of light sources. In the following description, the backlight unit 50 is assumed to be an edge type backlight unit.

Figure 5:
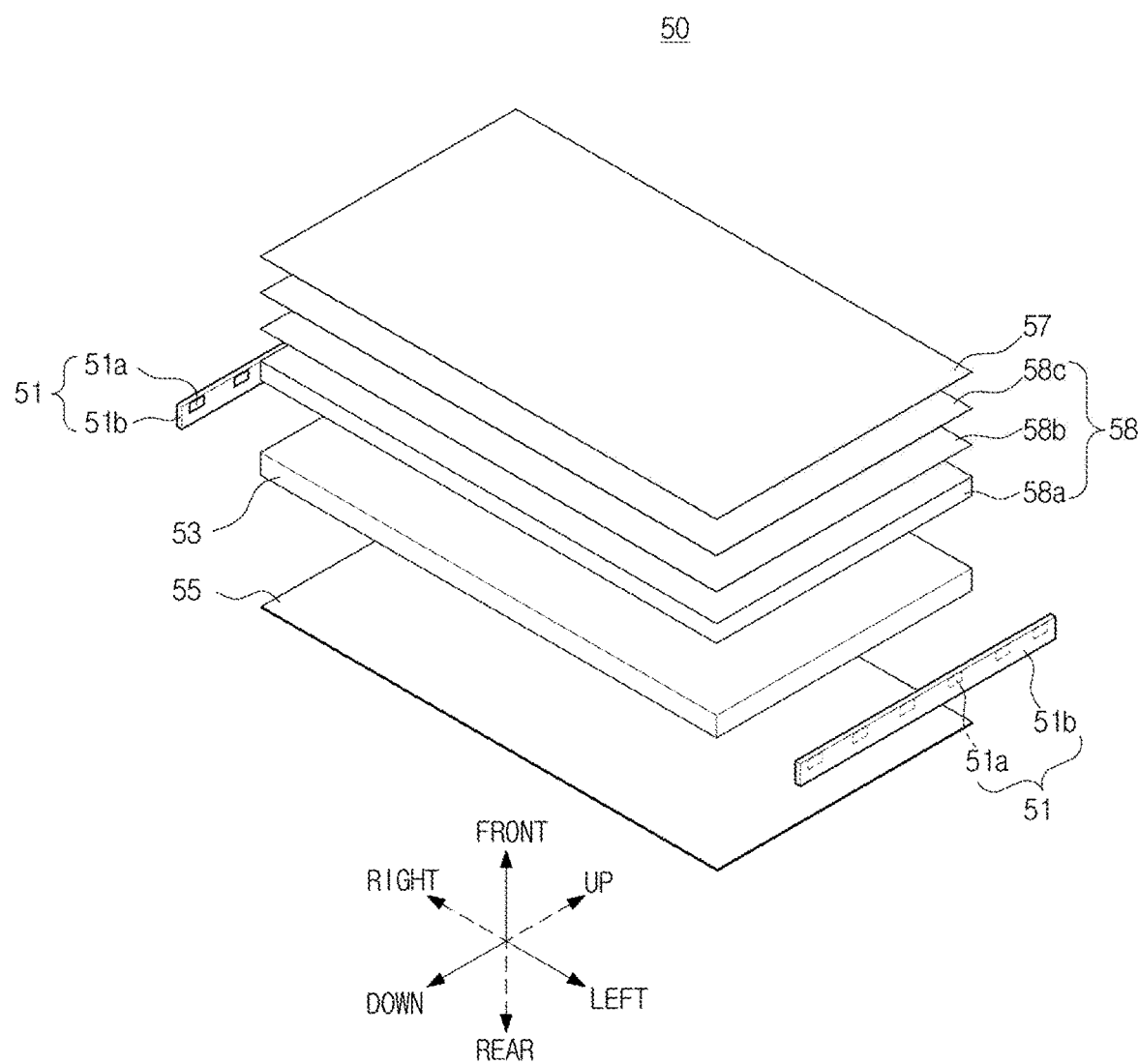
FIGS. 5 and 6 are exploded perspective views of a backlight unit according to an example embodiment.
Figure 6:
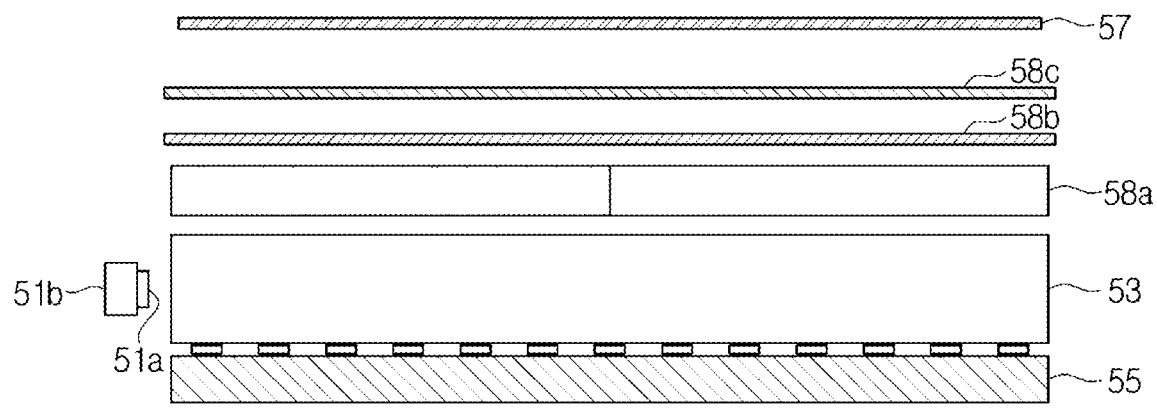

FIGS. 5 and 6 are exploded perspective views of a backlight unit according to an example embodiment.

Referring to FIGS. 3, 5, and 6, the backlight unit 50, which is an edge type backlight unit, may include a light emitting module 51 to generate light, a waveguide plate 53 to disperse light, a reflector sheet 55 to reflect light, a light adjusting portion 58 to block or transmit light output from the light guide plate 53, a quantum dot sheet 57 to receive light from the light adjusting portion 58 and output white light, and an optical sheet 40 to improve the brightness of light.

The light-emitting module 51 may include a plurality of light sources 51a to emit light, and a support 51b to support/fix the plurality of light sources 51a.

The plurality of light sources 51a may be arranged at regular intervals on one side of the backlight unit 50, as shown in FIG. 5, to emit light toward the center of the backlight unit 50.

The plurality of light sources 51a may be arranged at equidistant intervals so that light emitted from the plurality of light sources 51a has as constant brightness as possible. For example, the plurality of light sources 51a may be arranged at equidistant intervals on left and right sides of the backlight unit 50, as shown in FIG. 5. However, the light sources 51a may be arranged in any one of the left and right sides of the backlight unit 50.

The light sources 51a may be devices capable of emitting monochromatic light (light of a specific wavelength, for example, blue light) or white light (light obtained by mixing various wavelengths of light) in various directions when power is supplied. Since the backlight unit 50 according to the current embodiment includes the quantum dot sheet 57, the light sources 51a may be light sources to output monochromatic light, particularly, blue light having a short wavelength. In the following description, it is assumed that the light sources 51 output blue light.

The light sources 51a may be light-emitting diodes (LEDs) with a small amount of heat generation, or cold cathode fluorescence lamps (CCFL). For example, the light sources 51a may be blue LEDs that emit blue light as high-energy light. The blue LEDs may be fabricated with InGaN obtained by adding Indium (In) to a gallium-nitrogen (GaN) compound.

The support 51b may fix the plurality of light sources 51a so that the positions of the light sources 51b do not change. Also, the support 51b may supply power to the light sources 51a so that the light sources 51a can emit light.

The support 51b may be disposed on the side of the backlight unit 50, together with the light sources 51a. For example, as shown in FIG. 5, two supports 51b may be disposed on the left and right sides of the backlight unit 50. However, the support 51b may be disposed on any one of the left and right sides of the backlight unit 50. The support 51b may be made of a synthetic resin which fixes the plurality of light sources 51a, and on which a conductive power supply line is formed to supply power to the light sources 51a, or may be made of a printed circuit board (PCB).

The waveguide plate 53 may change a traveling direction of light that is incident from the light emitting module 51 disposed on the side of the backlight unit 50 to emit the light in a front direction. Also, the waveguide plate 53 may disperse light received from the light emitting module 51 disposed on the side of the backlight unit 50, and emit the dispersed light through a front surface 53a (see FIG. 3).

On the front surface 53a of the waveguide plate 53, a plurality of convex stripes may be formed to change a traveling direction of light, and on a rear surface 53b of the waveguide plate 53, a plurality of dots may be formed. Also, the sizes or intervals of the convex stripes may be adjusted so that uniform light is emitted toward the front surface of the waveguide plate 53, and also the sizes and intervals of the dots may be adjusted. Also, the convex stripes formed on the front surface 53a of the waveguide plate 53 may be embossed by a printing method, and the dots formed on the rear surface 53 of the waveguide plate 53 may be engraved by laser.

Since the light emitting module 51 is disposed on the side of the backlight unit 50, as described above, non-uniform brightness distribution may occur due to the position of the light emitting module 51. Accordingly, the waveguide plate 53 may diffuse light emitted from the light emitting module 51 therein in order to remove non-uniform brightness distribution due to the position of the light emitting module 51. For example, the waveguide plate 53 may have a milky color in order to diffuse light.

As shown in FIG. 3, a part L1 of light that entered the inside of the waveguide plate 53 may be scattered by dots formed on the rear surface 53b of the waveguide plate 53 to be emitted to the front surface 53a of the waveguide plate 53, and the other part L2 of the light may be reflected to the inside of the waveguide plate 53 by the reflector sheet 55 provided on the rear surface 53b of the waveguide plate 53. Also, the reflected light L2 may move toward the center of the waveguide plate 53, be scattered at the center of the waveguide plate 53, and then emitted to the front surface 53a of the waveguide plate 53.

The waveguide plate 53 may be made of poly methyl methacrylate (PMMA) or transparent polycarbonate (PC).

The reflector sheet 55 may be disposed on the rear surface of the waveguide plate 53 to reflect light emitted through the rear surface 53b of the waveguide plate 53 toward the waveguide plate 53.

The reflector sheet 55 may be fabricated by coating a base material with a material having high reflectivity. For example, the reflector sheet 55 may be fabricated by coating a base material such as polyethylene terephthalate (PET) with polymer having high reflectivity.

The quantum dot sheet 57 may convert light exiting from a front surface of the light adjusting portion 58 into white light. The quantum dot sheet 57 may include a fluorescent member including quantum dots, and a barrier film for preventing the quantum dots from being exposed to oxygen or moisture. Two barrier films may be disposed on front and rear surfaces of the fluorescent member.

The quantum dot is a small globe-shaped semiconductor particle having a nanometer-scale size, and may be composed of a central body having a size of about 2 to 10 nm and a shell made of zinc sulfide ZnS. The central body of the quantum dot may be made of cadmium selenite (CdSe), cadmium telluride (CdTe), or cadmium sulfide (CdS).

If a voltage is applied to the quantum dot, the quantum dot emits light or absorbs light to emit light of a specific wavelength. The electrons of the quantum dots are at a low energy level (or band) in a stable state. In this state, if the quantum dots absorb light from the outside, the electrons at the low energy level transit to a high energy level (or band). Since the electrons at the high energy level are in an unstable state, the electrons again transit from the high energy level to the low energy level. When the electrons transit from the high energy level to the low energy level, the electrons may emit light corresponding to an energy difference between the high energy level and the low energy level. The wavelength of the emitted light may be decided by the energy difference between the high energy level and the low energy level.

Particularly, the smaller size of a quantum dot emits light of the shorter wavelength, and the larger size of a quantum dot emits light of the longer wavelength. For example, a quantum dot having a diameter of 2 nm may emit blue light, and a quantum dot having a diameter of about 10 nm may emit red light.

Also, quantum dots of various sizes may be used to output various wavelengths of light ranging from red light to blue light. In other words, quantum dots having various sizes may be used to generate white light.

The fluorescent member of the quantum dot sheet 57 may be fabricated by dispersing the quantum dots in a resin. The resin may be made of a polymer acrylate resin material.

Each of the barrier films may be formed with polyethylene terephthalate (PET), and may include a transparent film to protect the fluorescent member from an external force, and a barrier layer coated on the transparent film in order to prevent moisture and oxygen from permeating the fluorescent member. The barrier layer may also be formed with silicon oxide (SiO or $SiO_2$) for transparency.

The optical sheet 40 may refract or scatter light in order to widen a viewing angle of the display apparatus 1 and increase the brightness of the display apparatus 1. The optical sheet 40 may include various sheets. For example, the optical sheet 40 may include a diffusion sheet 41, a prism sheet 43, a protection sheet 45, and a Double Brightness Enhancement Film (DBEF) 47, as shown in FIG. 2.

The diffusion sheet 41 may diffuse light emitted from the back light unit 50 over the surface so that the entire screen of the display apparatus 100 shows uniform colors and brightness. Since the light emitted from the light guide plate 53 passed through the patterns formed on the front surface 53a of the light guide plate 53, the patterns formed on the front surface 53a of the light guide plate 53 may be recognized from the light emitted from the light guide plate 53. In order to prevent the patterns formed on the front surface 53a of the light guide plate 53 from being recognized from the light emitted from the light guide plate 53, the diffusion sheet 41 may diffuse the light emitted from the light guide plate 53 in a direction that is perpendicular to the emitting direction of the light.

In other words, the diffusion sheet 41 may diffuse light emitted from the backlight unit 50 to maintain the brightness of the entire screen uniform. Alternatively, a microlens sheet, which can diffuse light like the diffusion sheet 41 and widen a viewing angle, may be used.

While the light passed through the diffusion sheet 41 is diffused in the direction that is perpendicular to the surface of the diffusion sheet 41, the brightness of the light may be sharply reduced. The prism sheet 43 may refract or focus the light diffused by the diffusion sheet 41 to thereby increase the brightness of the light.

The prism sheet 43 may include a plurality of prism patterns, each having a triangular prism shape, and the prism patterns may be arranged adjacent to each other so as to form a plurality of bands. That is, the prism patterns may be repetitive patterns of mountains and valleys, and may protrude in rows toward the image forming unit 20.

The protection sheet 45 may protect various components included in the back light unit 50 from an external impact or foreign materials. Since the prism sheet 43 is vulnerable to scratches, the protection sheet 45 may prevent the prism sheet 43 from being scratched.

The DBEF 47 may be a kind of a polarizing film, and is also called a reflective polarizing film. The DBEF 47 may transmit polarized light incident in a direction that is parallel to the polarizing direction of the DBEF 47, among light emitted from the back light unit 50, and reflect polarized light incident in a direction that is different from the polarizing direction of the DBEF 47, among the light emitted from the back light unit 50.

The light is a traverse wave that vibrates in a direction that is perpendicular to its propagation direction. The polarizing film may transmit light vibrating in a specific direction and absorb light vibrating in other directions.

Meanwhile, the DBEF 47 may reflect polarized light incident in a direction that is different from the polarizing direction of the DBEF 47. The reflected light may be recycled in the inside of the back light unit 50, and due to the light recycle, the brightness of the display apparatus 100 may be improved.

The backlight unit 50 according to an example embodiment may include the light adjusting portion 58 disposed between the waveguide plate 53 and the quantum dot sheet 57, and configured to transmit or block light emitted from the waveguide plate 53.

As shown in FIGS. 5 and 6, the light adjusting portion 58 may include a cholesteric liquid crystal layer 58a disposed on the front surface of the waveguide plate 53, and a polarizing portion disposed on the front surface of the cholesteric liquid crystal layer 58a and configured to polarize light transmitted through the cholesteric liquid crystal layer 58a to transmit or block the polarized light. The polarizing portion may include a waveplate such as a quarter-wave plate (QWP) 58b disposed on the front surface of the cholesteric liquid crystal layer 58a, and a polarizing film 58c disposed on the front surface of the QWP 58b.

Figure 7:
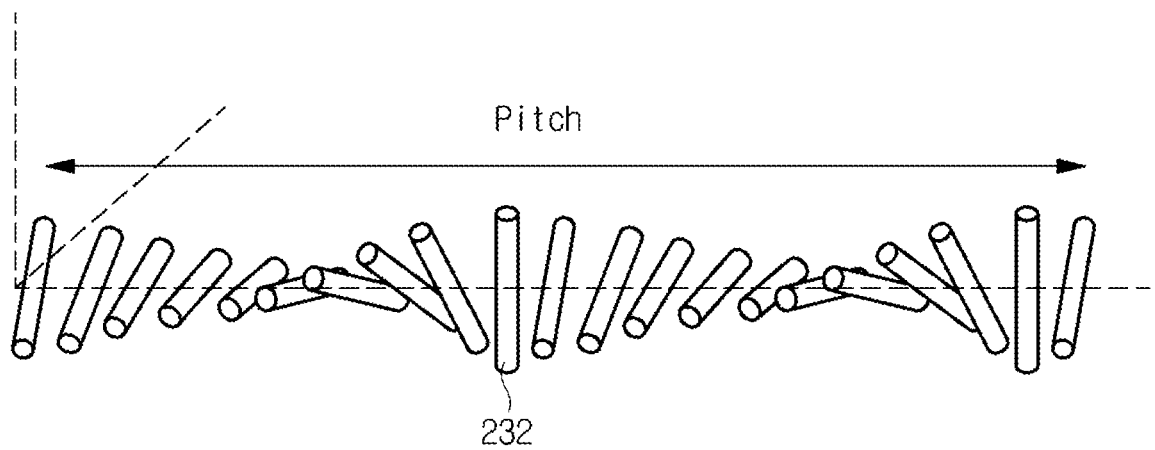
FIG. 7 shows a structure of cholesteric liquid crystal.
Figure 8:
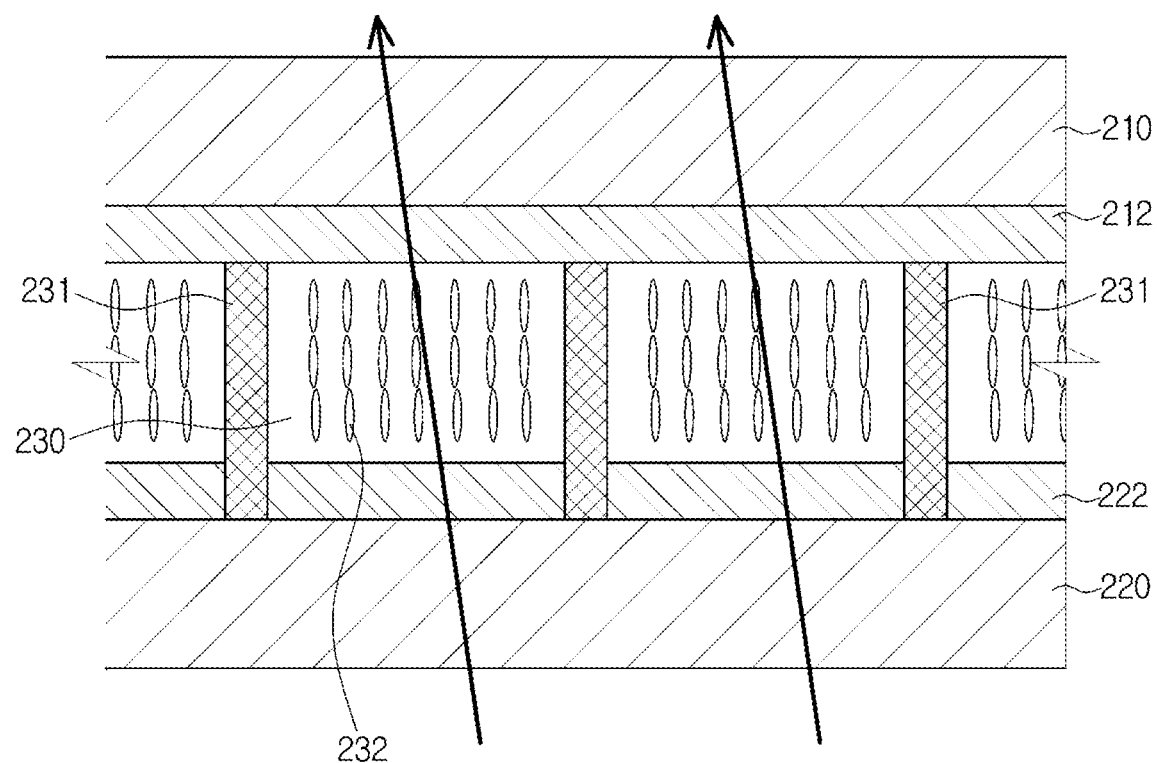
FIGS. 8 to 10 show the cholesteric liquid crystal layer of the backlight unit according to an example embodiment when the cholesteric liquid crystal layer is in different states.
Figure 9:
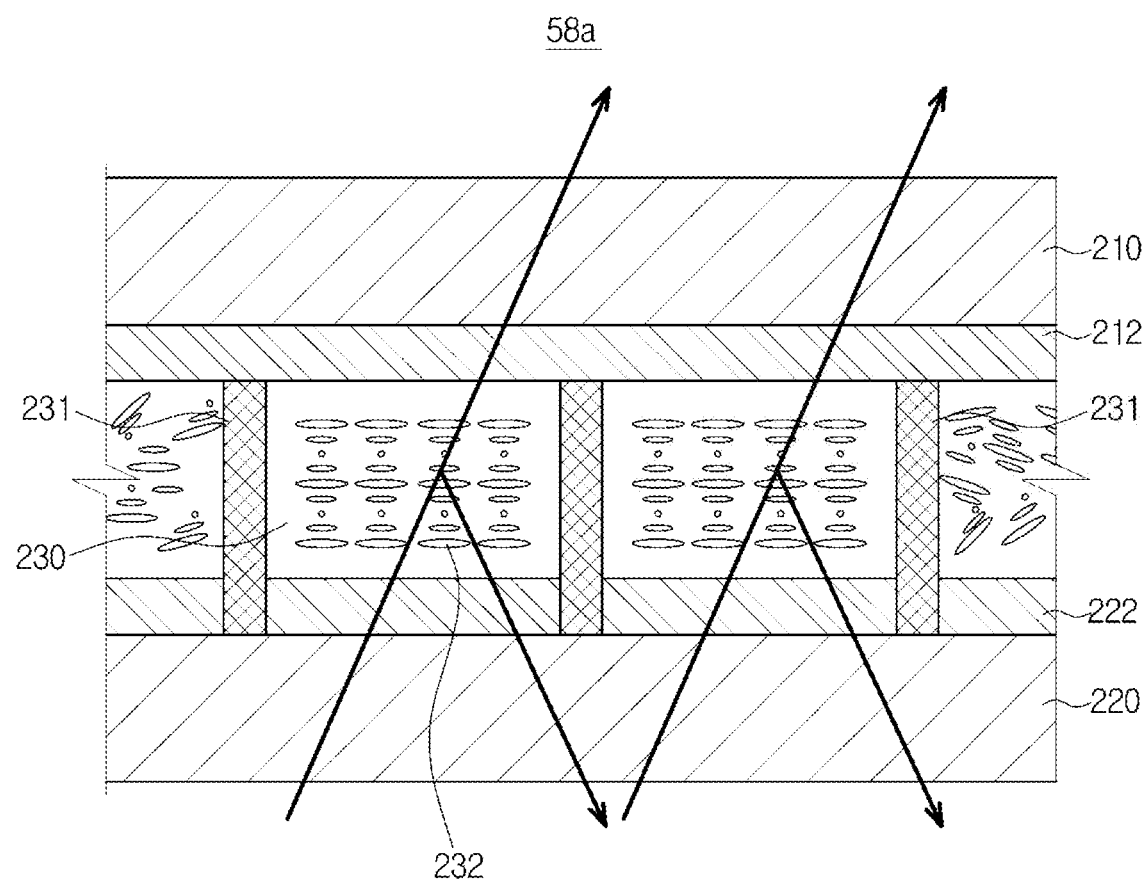
Figure 10:
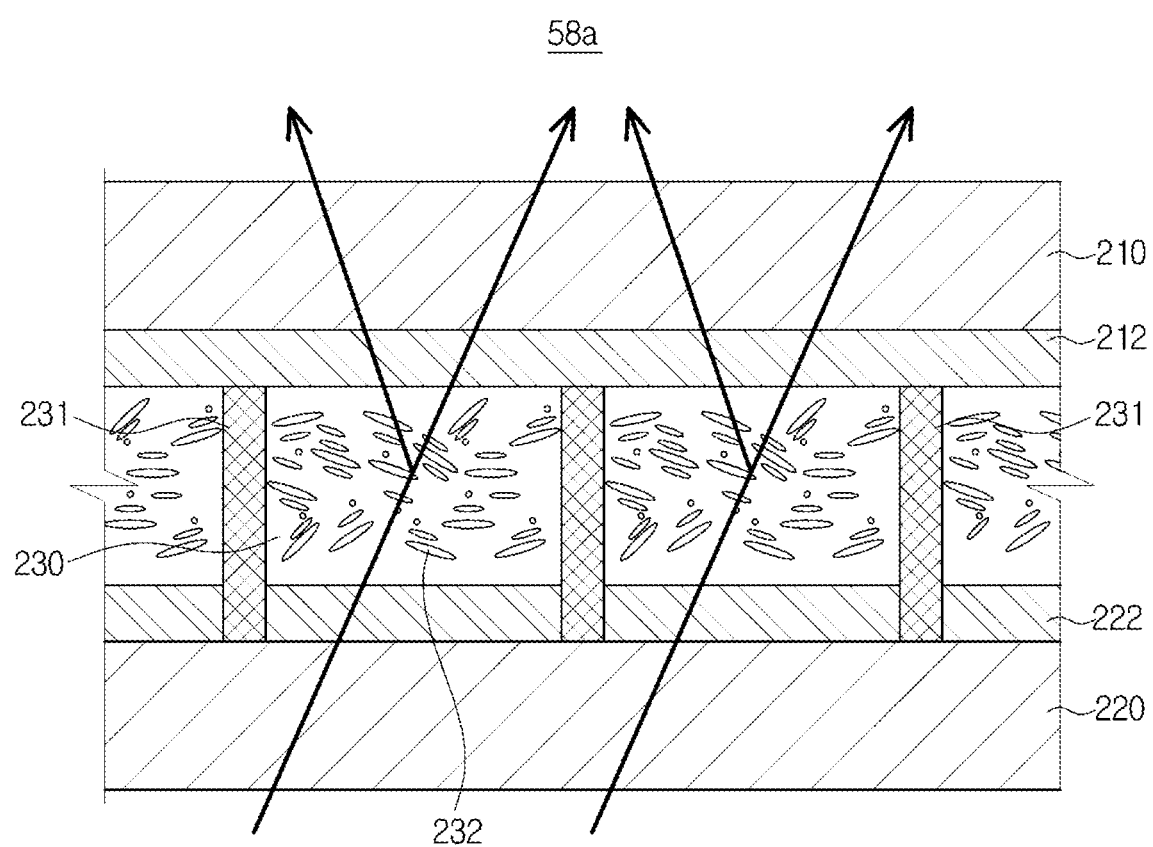

The cholesteric liquid crystal layer 58a may circularly polarize light exiting from the waveguide plate 53 to transmit the circularly polarized light in the front direction, or may transmit the light exiting from the waveguide plate 53 as it is in the front direction without polarizing it, according to the state of cholesteric liquid crystal. The cholesteric liquid crystal layer 58a will be described in detail with reference to FIGS. 7 to 10. FIG. 7 shows a structure of cholesteric liquid crystal, and FIGS. 8 to 10 show the cholesteric liquid crystal layer of the backlight unit according to an example embodiment when the cholesteric liquid crystal layer is in different states.

As shown in FIG. 7, cholesteric liquid crystal 232 may have a helical structure in which molecules are twisted at regular intervals. The interval at which the same twisted structure of molecules appears is called "pitch," and the cholesteric liquid crystal 232 may have a characteristic of selectively reflecting light according to the twisted direction of the helical structure and the pitch of the helical structure.

A reflection wavelength region may be decided by the pitch, and a wavelength $\lambda$ at which reflection is maximum may be decided as $\lambda = n \cdot p$, wherein n is an average refractive index of the cholesteric liquid crystal molecules 232, according to Bragg's law.

In order to cause the cholesteric liquid crystal 232 to have a helical structure, chiral dopants may be added, and the pitch may be adjusted according to a percentage of chiral dopants. As the percentage of chiral dopants increases, the pitch may be reduced, resulting in a lower reflection wavelength region. Accordingly, by adjusting chirality appropriately to reflect a specific wavelength of a visible light region among external light entering the cholesteric liquid crystal 232, a color can be implemented, or the transmittance of incident light may increase to look transparent.

The cholesteric liquid crystal 232 has bistability so that it can exist in any one of two stable states of: a planar state in which it reflects light even when no voltage is applied; and a focal conic state in which it diffuses light. Also, the cholesteric liquid crystal 232 may transit to a homeotropic state in which it can transmit light when a high voltage (e.g., a voltage exceeding a threshold voltage level) is applied.

The planar state is a state in which the helical axis of the cholesteric liquid crystal 232 is substantially perpendicular to a substrate, for example, a first substrate 220, and the focal conic state is a state in which the helical axis of the cholesteric liquid crystal 232 is substantially parallel to the first substrate 220.

If low-voltage pulses are applied to the cholesteric liquid crystal 232 in the planar state, the helical axis that is perpendicular to the first substrate 232 may become parallel to the first substrate 220, so that the cholesteric liquid crystal 232 may transit to the focal conic state. If a high voltage continues to be applied to the cholesteric liquid crystal 232 in the focal conic state, the helical structure may be untwisted so that the cholesteric liquid crystal 232 may transit to the homeotropic state in which the major axes of the liquid crystal molecules are arranged to be perpendicular to the substrate 220. If the voltage applied to the cholesteric liquid crystal 232 in the homeotropic state is reduced gradually, the cholesteric liquid crystal 232 may transit to the focal conic state, and if the applied voltage is removed abruptly, the cholesteric liquid crystal 232 may transit to the planar state. The terminologies "high voltage," "low voltage," etc. may indicate relative and/or predetermined levels of voltage, and may be determined by one or more threshold values. The individual states of the liquid crystal layer 230 will be described with reference to FIGS. 8 to 10, below.

FIG. 8 shows an arrangement of liquid crystal in the homeotropic state. When liquid crystal is in the homeotropic state, the helical structure of the liquid crystal may be untwisted so that liquid crystal molecules are arranged in a direction of an electric field. The arrangement of the liquid crystal molecules in the homeotropic state may be an arrangement of liquid crystal molecules of when a high voltage is applied to a first electrode 222 and a second electrode 212 so that a high electrical field is applied between the first electrode 222 and the second electrode 212. The arrangement of the liquid crystal molecules may have a characteristic of transmitting light.

FIG. 9 shows an arrangement of liquid crystal in the planar state. In the planar state, the helical axis of the cholesteric liquid crystal 232 may be substantially perpendicular to the substrate, for example, the first substrate 220. The liquid crystal layer 230 may be arranged in the planar state when the high electric field applied to the liquid crystal in the homeotropic state is removed abruptly. When the cholesteric liquid crystal 232 is in the planar state, incident light may be circularly polarized in a specific direction according to the twisted direction of the liquid crystal to be transmitted, and light circularly polarized in the opposite direction may be reflected. For example, cholesteric liquid crystal in the planar state may left-handed circularly polarize light (i.e., counter-clockwise circularly polarized when viewed by the receiver) exiting from the waveguide plate 53 to transmit the resultant light, and reflect right-handed circularly polarized light (i.e., clockwise circularly polarized when viewed by the receiver).

FIG. 10 shows an arrangement of liquid crystal in the focal conic state. In the focal conic state, the helical axis of the cholesteric liquid crystal 232 may be substantially parallel to the first substrate 220. A structure of liquid crystal in the focal conic state may have a characteristic of scattering or diffusely reflecting light. In the focal conic state, if a substrate of the liquid crystal layer 230 is a transparent substrate, incident light may be transmitted through the liquid crystal layer 230.

The structure of liquid crystal in the focal conic state may be formed when the high voltage applied to the liquid crystal in the homeotropic state is lowered gradually. Also, the structure of liquid crystal in the focal conic state may be formed when low-voltage pulses are applied to the cholesteric liquid crystal 232 in the planar state. If a high voltage continues to be applied to the cholesteric liquid crystal 232 in the focal conic state, the helical structure may be untwisted so that the cholesteric liquid crystal 232 may transit to the homeotropic state in which liquid crystal molecules are arranged in the direction of an electric field. Also, if high-voltage pulses are applied to the cholesteric liquid crystal 232 in the focal conic state, the cholesteric liquid crystal 232 may transit to the planar state.

The cholesteric liquid crystal molecules may be located in space divided by partition walls, as shown in FIGS. 8, 9, and 10. However, the cholesteric liquid crystal molecules may be divided by capsules.

Cholesteric liquid crystal molecules located in each space may transit to the homeotropic state, the planar state, or the focal conic state according to a voltage applied by the first electrode 222 and the second electrode 212, so as to circularly polarize light exiting from the waveguide plate 53, or to transmit the light as it is without polarizing it.

The light adjusting portion 58 of the backlight unit 50 according to an example embodiment may include a quarter-wave plate 58b disposed on the front surface of the cholesteric liquid crystal layer 58a described above.

The quarter-wave plate 58b may include a thin plate of optical anisotropy configured to generate an optical path difference of $\lambda/4$ between two polarizing members vibrating vertically to each other with respect to transmitted light having a wavelength of $\lambda$. If linearly polarized light is incident vertically to the quarter-wave plate 58b so that a vibration direction of light forms an 45 degree angle with respect to a vibration direction of the incident light in the inside of the quarter wave plate 58b, the light passing through the quarter-wave plate 58b may become circularly polarized light, and if circularly polarized light is incident to the quarter-wave plate 58b, light passing through the quarter-wave plate 58b may become linearly polarized light.

Light passing through the cholesteric liquid crystal 232 may include at least one kind of light among circularly polarized light and non-polarized light, according to a state of the cholesteric liquid crystal 232, as described above. If circularly polarized light is incident to the quarter-wave plate 58b, the quarter-wave plate 58b may linearly polarize the circularly polarized light to transmit the linearly polarized light. If non-polarized light is incident to the quarter-wave plate 58b, the quarter-wave plate 58b may transmit the incident light as it is without polarizing it.

The light adjusting portion 58 may include a polarizing film 58c disposed on the front surface of the quarter-wave plate 58b. The polarizing film 58c disposed on the front surface of the quarter-wave plate 58b may be a reflective polarizing film capable of linearly polarizing incident light to transmit it or reflecting the incident light. For example, the polarizing film 58c may be implemented using a DBEF. The DBEF may have a structure resulting from stacking an isotropic film and an anisotropic film alternately to polarize and reflect incident light or to transmit incident light.

The polarizing film 58c may have a polarizing axis extending in a different direction from a polarizing axis of linearly polarized light passing through the quarter-wave plate 58c. If the linearly polarized light passing through the quarter-wave plate 58b is incident to the polarizing film 58c, the polarizing film 58c may reflect the incident light without transmitting it, thereby blocking the light adjusting portion 58 from emitting light.

Also, if non-polarized light passes through the quarter-wave plate 58b to be incident to the polarizing film 58c, the polarizing film 58c may transmit light linearly polarized in the direction of the polarizing axis of the polarizing film 58c, thereby allowing the light adjusting portion 58 to emit light.

An example in which the light adjusting portion 58 including the cholesteric liquid crystal layer 58a, the quarter-wave plate 58b, and the polarizing film 58c transmits light exiting from the waveguide plate 53 in the front direction or blocks the light will be described with reference to FIGS. 11 to 15, below.

Figure 11:
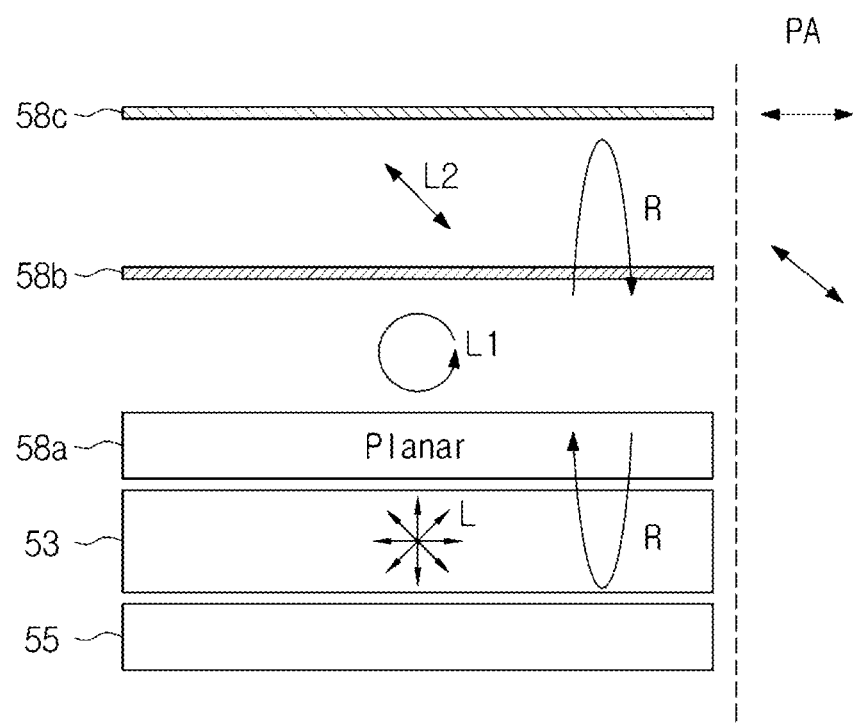
FIG. 11 shows a case in which no light is emitted from the backlight unit according to an example embodiment.
Figure 12:
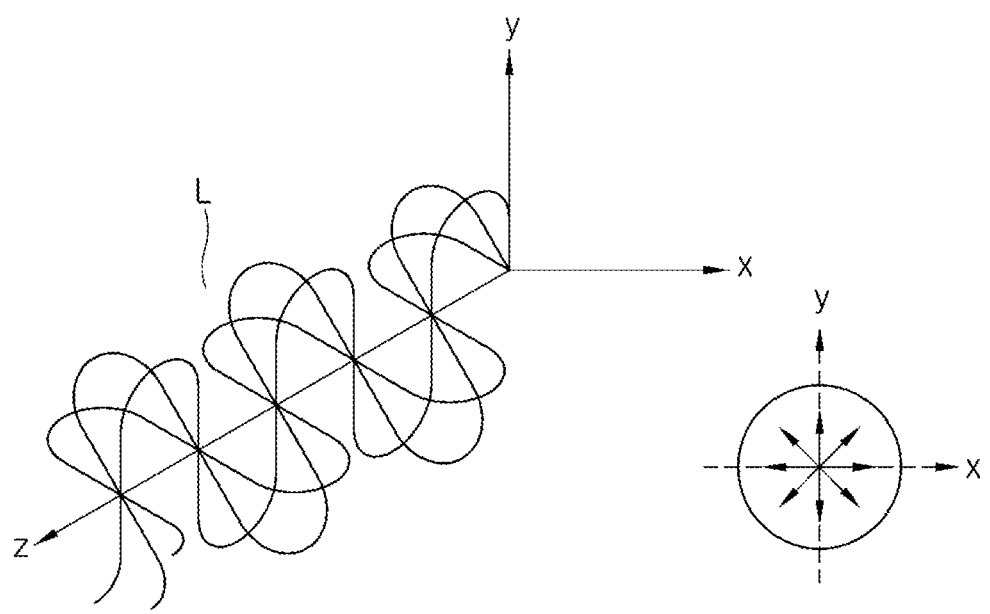
FIG. 12 shows light emitted from the waveguide plate of the backlight unit according to an example embodiment.
Figure 13:
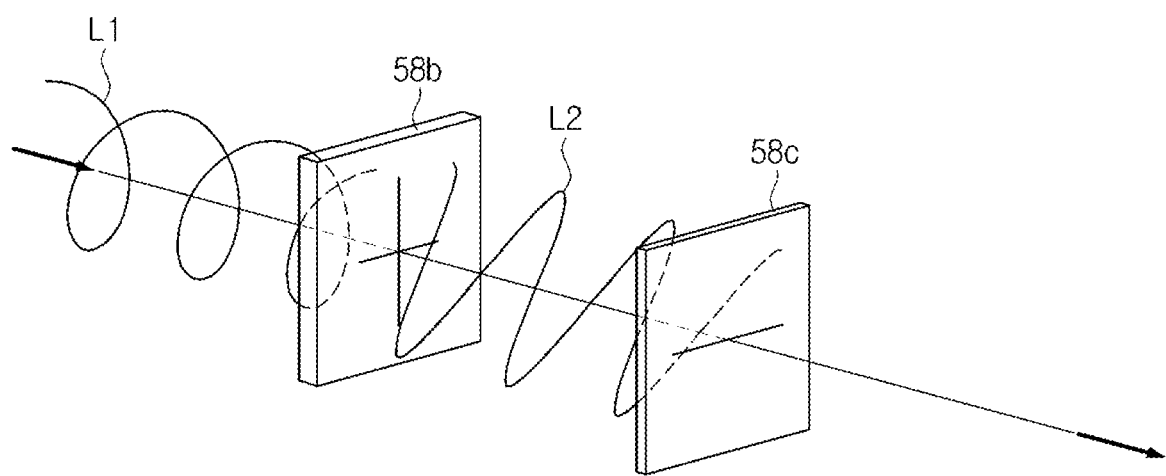
FIG. 13 shows a case in which light incident to the polarizing portion of the backlight unit is blocked according to an example embodiment.
Figure 14:
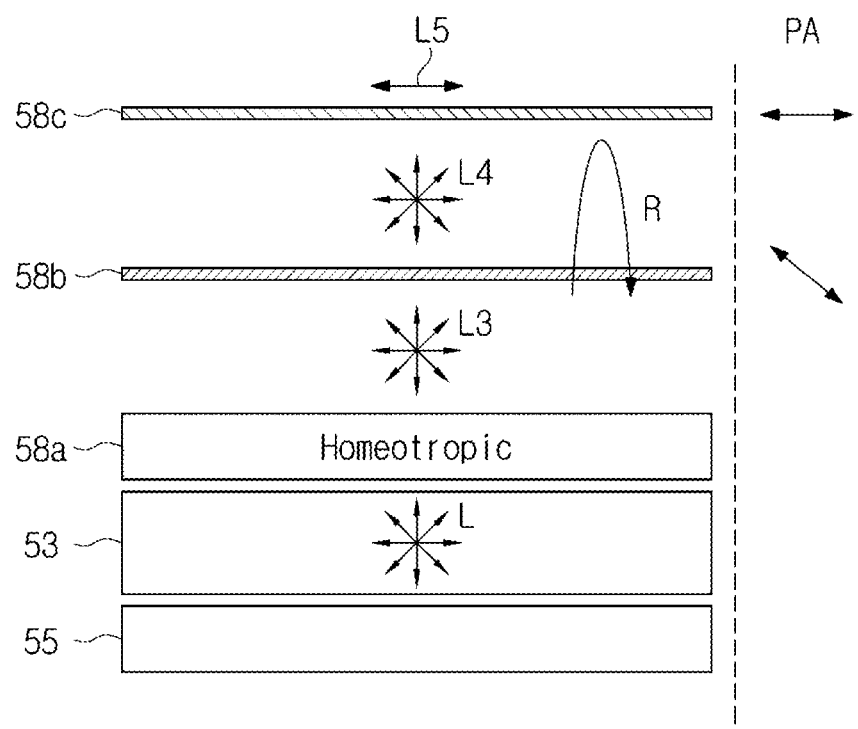
FIG. 14 shows a case in which light is emitted from the backlight unit according to an example embodiment.
Figure 15:
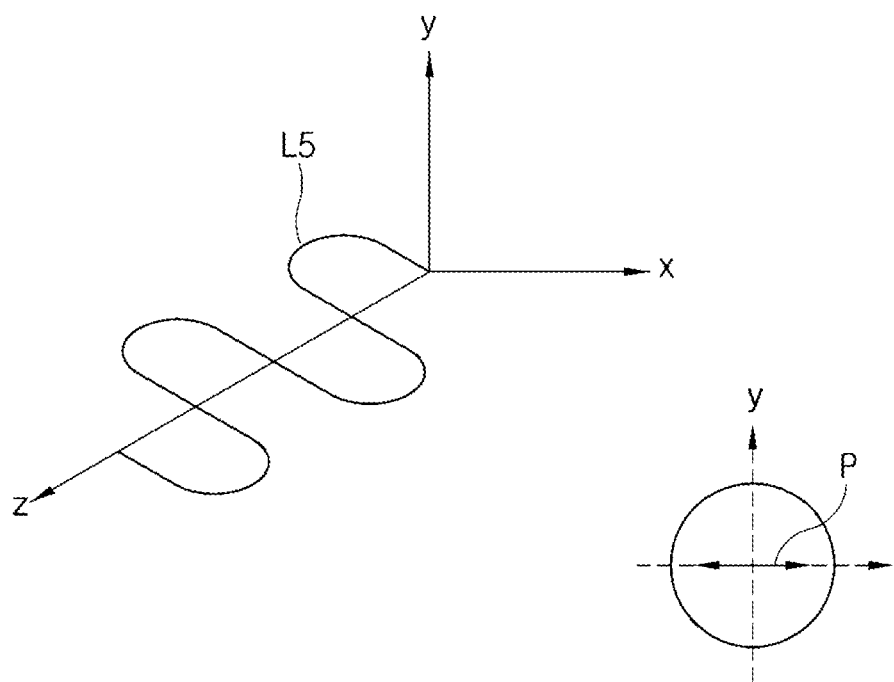
FIG. 15 shows light transmitted through the polarizing portion of the backlight unit according to an example embodiment.

FIG. 11 shows a case in which no light is emitted from the backlight unit according to an example embodiment of the present disclosure, and FIG. 12 shows light emitted from the waveguide plate of the backlight unit according to an example embodiment. FIG. 13 shows a case in which light incident to the polarizing portion of the backlight unit is blocked according to an example embodiment, and FIG. 14 shows a case in which light is emitted from the backlight unit according to an example embodiment. FIG. 15 shows light transmitted through the polarizing portion of the backlight unit according to an example embodiment.

Referring to FIG. 11, light exiting from the waveguide plate 53 may be incident to the cholesteric liquid crystal layer 58a without being polarized. Light L is propagated when an electric field and a magnetic field being orthogonal to each other vibrate. In this case, the electric field or the magnetic field of the light L may be transmitted while vibrating in directions (X axis and Y axis) that are perpendicular to a traveling direction (Z axis) of the light L, as shown in FIG. 12. Non-polarized light L exiting from the waveguide plate 53 may be mixed light of light vibrating in all directions that are perpendicular to the traveling direction (Z axis), as shown in FIG. 12.

If light exiting from the waveguide plate 53 is incident to liquid crystal in the planar state of the cholesteric liquid crystal layer 58a, the light may be circularly polarized (L2), and then transmitted through the cholesteric liquid crystal layer 58a, as described above. Circularly polarized light may be right-handed circularly polarized light or left-handed circularly polarized light according to the twisted direction of cholesteric liquid crystal. For example, if left-handed circularly polarized light is transmitted, right-handed circularly polarized light may be reflected toward the reflector sheet 55 by the cholesteric liquid crystal 232. The reflected light may be recycled inside the waveguide plate 53 to contribute to increase brightness of the display apparatus 100.

The circularly polarized light L1 transmitted through the cholesteric liquid crystal in the planar state may be incident to the quarter-wave plate 58b. As shown in FIG. 13, if the circularly polarized light L1 is incident to the quarter-wave plate 58b, the quarter-wave plate 58b may linearly polarize the circularly polarized light L1 to transmit the linearly polarized light, as shown in FIG. 13. As described above, since the polarizing film 58c has a polarizing axis that is different from that of the linearly polarized light L2 transmitted through the quarter-wave plate 58b, the light linearly polarized and incident to the polarizing film 58c may be reflected without being transmitting through the polarizing film 58c.

That is, light incident to the liquid crystal in the planar state of the cholesteric liquid crystal layer 58a may not be transmitted through the light adjusting portion 58. Accordingly, pixels corresponding to the liquid crystal in the planar state of the cholesteric liquid crystal layer 58a may be displayed darker than the adjacent pixels that represent a deep black color, resulting in an improvement of a contrast ratio.

Meanwhile, as shown in FIG. 14, if light exiting from the waveguide plate 53 is incident to liquid crystal in the homeotropic state or the focal conic state of the cholesteric liquid crystal layer 58a, the light may be transmitted through the cholesteric liquid crystal layer 58a without being polarized, as described above.

If the non-polarized light L3 is incident to the quarter-wave plate 58b, the quarter wave plate 58b may transmit the non-polarized light L3 as it is. The light L4 transmitted through the quarter-wave plate 58b may be linearly polarized in the direction of the polarizing axis of the polarizing film 58c to be transmitted through the polarizing film 58c and then incident to the quantum dot sheet 57.

If the non-polarized light L4 is transmitted through the polarizing film 58c, the light L4 may include an electric field or a magnetic field vibrating only on a specific plane that is perpendicular to the traveling direction (Z axis) of the light. This is a case in which light is polarized, particularly, linearly polarized. The linearly polarized light L5 may vibrate in a predetermined direction p to be transmitted. For example, the linearly polarized light L5 may vibrate on a horizontal plane defined by the horizontal axis (X axis) and the traveling direction (Z axis), and move in the traveling direction (Z axis). Alternatively, the light L5 may move while vibrating on a vertical plane defined by the vertical axis (Y axis) and the traveling direction (Z axis), according to the polarizing axis. The polarizing axis is defined as an axis on which polarized light vibrates, for convenience of description. For example, the X axis of FIG. 15 is defined as the polarizing axis. As described above, light incident to the liquid crystal in the planar state of the cholesteric liquid crystal layer 58a may not be transmitted through the light adjusting portion 58, and light incident to the liquid crystal in the homeotropic state or the liquid crystal in the focal conic state may be transmitted through the light adjusting portion 58. Pixels corresponding to the liquid crystal in the planar state of the cholesteric liquid crystal layer 58a may be displayed darker than the adjacent pixels, and pixels corresponding to the liquid crystal in the homeotropic state or the liquid crystal in the focal conic state may be displayed brighter than the adjacent pixels, which contributes to an improvement of a contrast ratio.

Although the display apparatus according to an example embodiment adopts an edge type backlight unit, the display apparatus can implement matrix local dimming, like when it adopts a direct type backlight unit. Accordingly, the display apparatus according to an example embodiment can provide a significantly improved contrast ratio, like local dimming of when it adopts a direct type backlight unit.

According to an aspect of an example embodiment, a display apparatus including an edge type backlight unit may implement matrix local dimming.

Also, a contrast ratio may be improved, resulting in an improvement in image quality.

Although a few example embodiments of the present disclosure have been shown and described, it would be appreciated by those skilled in the art that changes may be made in these example embodiments without departing from the principles and spirit of the disclosure, the scope of which is defined in the claims and their equivalents.

What is claimed is:

1. A display apparatus comprising:
a backlight unit; and
an image forming unit configured to create an image by performing at least one from among transmitting and blocking light emitted from the backlight unit,
wherein the backlight unit comprises:
a waveguide plate;
a cholesteric liquid crystal layer disposed in front of the waveguide plate, and configured to perform at least one from among transmitting and circularly polarizing the light emitted from the waveguide plate, and to generate at least one from among transmitted light and circularly polarized light;
a polarizing portion disposed in front of the cholesteric liquid crystal layer, and configured to transmit the transmitted light in a front direction, and to block the circularly polarized light, the polarizing portion comprising:
a waveplate disposed in front of the cholesteric liquid crystal layer, and configured to linearly polarize the circularly polarized light to generate linearly polarized light, and to transmit the transmitted light in the front direction; and
a polarizing film disposed in front of the waveplate, and configured to block the linearly polarized light, and to linearly polarize the transmitted light; and
a quantum dot sheet disposed in front of the polarizing portion.

2. The display apparatus according to claim 1, wherein the polarizing film is further configured to polarize incident light in a first direction of a first polarizing axis that is different from a second direction of a second polarizing axis of the linearly polarized light that is linearly polarized by the waveplate.

3. The display apparatus according to claim 1, wherein the waveplate is a quarter-wave plate.

4. The display apparatus according to claim 1, wherein the backlight unit applies no voltage to a first part of the cholesteric liquid crystal layer so that the first part of the cholesteric liquid crystal layer transits to a planar state, and applies a voltage to a second part of the cholesteric liquid crystal layer so that the second part of the cholesteric liquid crystal layer transits to one from among a homeotropic state and a focal conic state.

5. The display apparatus according to claim 1, wherein the cholesteric liquid crystal layer comprises:
cholesteric liquid crystal;
a front electrode disposed in front of the cholesteric liquid crystal; and
a rear electrode disposed behind the cholesteric liquid crystal, and arranged to be orthogonal to the front electrode.

6. A backlight unit comprising:
a waveguide plate;
a light source disposed on one side of the waveguide plate, and configured to emit light toward the waveguide plate;
a cholesteric liquid crystal layer disposed in front of the waveguide plate, and configured to perform at least one from among transmitting and circularly polarizing the light emitted from the waveguide plate, and to generate at least one from among transmitted light and circularly polarized light;
a polarizing portion disposed in front of the cholesteric liquid crystal layer, and configured to emit the transmitted light in a front direction, and to block the circularly polarized light, the polarizing portion comprising:
a waveplate disposed in front of the cholesteric liquid crystal layer, and configured to linearly polarize the circularly polarized light to generate linearly polarized light, and to transmit the transmitted light in the front direction; and
a polarizing film disposed in front of the waveplate, and configured to block the linearly polarized light, and to linearly polarize the transmitted light; and
a quantum dot sheet disposed in front of the polarizing portion.

7. The backlight unit according to claim 6, wherein the polarizing film is further configured to polarize incident light in a first direction of a first polarizing axis that is different from a second direction of a second polarizing axis of the linearly polarized light that is linearly polarized by the waveplate.

8. The backlight unit according to claim 6, wherein the waveplate is a quarter-wave plate.

9. The backlight unit according to claim 6, wherein the cholesteric liquid crystal layer applies no voltage to a first part of the cholesteric liquid crystal layer so that the first part of the cholesteric liquid crystal layer transits to a planar state, and applies a voltage to a second part of the cholesteric liquid crystal layer so that the second part of the cholesteric liquid crystal layer transits to one from among a homeotropic state and a focal conic state.

10. The backlight unit according to claim 6, wherein the cholesteric liquid crystal layer comprises:
cholesteric liquid crystal;
a front electrode disposed in front of the cholesteric liquid crystal; and
a rear electrode disposed behind the cholesteric liquid crystal, and arranged to be orthogonal to the front electrode.

11. A display apparatus comprising:
a backlight unit; and
an image forming unit configured to create an image by performing at least one from among transmitting and blocking light emitted from the backlight unit, the image forming unit comprising a first polarizing film at a bottom of the image forming unit,
wherein the backlight unit comprises:
a waveguide plate;
a cholesteric liquid crystal layer disposed in front of the waveguide plate, and configured to perform at least one from among transmitting and circularly polarizing the light emitted from the waveguide plate, and to generate at least one from among transmitted light and circularly polarized light;

a waveplate disposed in front of the cholesteric liquid crystal layer, and configured to linearly polarize the circularly polarized light to generate linearly polarized light, and to transmit the transmitted light in a front direction;

a second polarizing film disposed in front of the waveplate, and configured to block the linearly polarized light, and to linearly polarize the transmitted light; and a quantum dot sheet disposed in front of the second polarizing film.

12. The display apparatus according to claim 11, wherein the polarizing film is further configured to polarize incident light in a first direction of a first polarizing axis that is different from a second direction of a second polarizing axis of the linearly polarized light that is linearly polarized by the waveplate.

13. The display apparatus according to claim 11, wherein the waveplate is a quarter-wave plate.

14. The display apparatus according to claim 4, wherein, in response to the cholesteric liquid crystal layer transiting to the planar state, an helical axis of the cholesteric liquid crystal layer is substantially perpendicular to a substrate of the cholesteric liquid crystal layer, wherein, in response to the cholesteric liquid crystal layer transiting to the homeotropic state, a helical structure of the cholesteric liquid crystal layer is untwisted and liquid crystal molecules of the cholesteric liquid crystal layer are arranged in a direction of an electric field generated by the voltage, and wherein, in response to the cholesteric liquid crystal layer transiting to the focal conic state, the helical axis of the cholesteric liquid crystal layer is substantially parallel to the substrate of the cholesteric liquid crystal layer.

15. The display apparatus according to claim 5, wherein, based on a voltage being applied between the first electrode and the second electrode, the cholesteric liquid crystal layer transits to at least one from among a planar state, a homeotropic state, and a focal conic state.

16. The display apparatus according to claim 1, wherein the polarizing film is a double brightness enhancement film.

* * * * *